United States Patent
Balakrishnan et al.

(10) Patent No.: US 11,010,401 B2
(45) Date of Patent: May 18, 2021

(54) EFFICIENT SNAPSHOT GENERATION OF DATA TABLES

(71) Applicant: Microsoft Technology Licensing, LLC, Redmond, WA (US)

(72) Inventors: Venkates Paramasivam Balakrishnan, Redmond, WA (US); Krishnan Varadarajan, Redmond, WA (US); Maneesh Sah, Sammamish, WA (US); Jegan Devaraju, Redmond, WA (US); Advait Kumar Mishra, Bellevue, WA (US); Zichen Sun, Bellevue, WA (US); Shane Kumar Mainali, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1042 days.

(21) Appl. No.: 15/497,022

(22) Filed: Apr. 25, 2017

(65) Prior Publication Data
US 2018/0307736 A1 Oct. 25, 2018

(51) Int. Cl.
*G06F 16/27* (2019.01)
*G06F 16/22* (2019.01)

(52) U.S. Cl.
CPC .......... *G06F 16/27* (2019.01); *G06F 16/2219* (2019.01); *G06F 16/2246* (2019.01); *G06F 2201/84* (2013.01)

(58) Field of Classification Search
CPC ... G06F 16/27; G06F 16/2246; G06F 16/2219
USPC ....................................................... 707/649
See application file for complete search history.

(56) References Cited

U.S. PATENT DOCUMENTS

| | | | |
|---|---|---|---|
| 7,873,619 B1* | 1/2011 | Faibish | G06F 16/13 707/705 |
| 9,519,591 B2* | 12/2016 | Lomet | G06F 16/2246 |
| 9,542,406 B1* | 1/2017 | Bourbonnais | G06F 16/2358 |
| 9,613,120 B1* | 4/2017 | Kharatishvili | G06F 16/27 |
| 10,152,493 B1* | 12/2018 | Kirsch | G06F 16/184 |
| 10,261,960 B2* | 4/2019 | Regni | G06F 3/0608 |
| 10,540,095 B1* | 1/2020 | Cheng | G06F 16/13 |
| 10,761,742 B1* | 9/2020 | Neporada | G06F 3/0647 |
| 2003/0215138 A1* | 11/2003 | Raghupathy | G06K 9/222 382/186 |

(Continued)

*Primary Examiner* — Mark E Hershley
(74) *Attorney, Agent, or Firm* — Workman Nydegger

(57) ABSTRACT

A snapshot of data from a table associated with a particular user may be generated. Tree data structures that are distributed across multiple computer systems may be accessed. Each of the tree structures may include data associated with one or more users. At least one tree data structure of the tree data structures that includes data associated with the particular user of the one or more users may be identified. The at least one tree data structure may then be filtered. Filtering may comprise identifying only data that is associated with the particular user. A snapshot of the data associated with the particular user may be generated. Generating the snapshot of the data associated with the particular user comprises generating a data structure that is configured to map to each data page of the at least one tree data structure that includes data associated with the particular user.

20 Claims, 5 Drawing Sheets

(56) References Cited

U.S. PATENT DOCUMENTS

| | | | |
|---|---|---|---|
| 2004/0078641 A1* | 4/2004 | Fleischmann | G06F 11/1469 714/6.12 |
| 2007/0027929 A1* | 2/2007 | Whelan | G06F 16/1734 |
| 2009/0177988 A1* | 7/2009 | Martins | G06F 16/2428 715/764 |
| 2012/0110515 A1* | 5/2012 | Abramoff | G06F 16/904 715/854 |
| 2013/0024487 A1* | 1/2013 | Yi | G06F 40/111 708/136 |
| 2013/0080389 A1* | 3/2013 | Curley | G06F 16/128 707/639 |
| 2013/0159307 A1* | 6/2013 | Wolge | G06F 16/26 707/737 |
| 2014/0068448 A1* | 3/2014 | Plost | G06Q 50/02 715/738 |
| 2014/0189270 A1* | 7/2014 | Iwanicki | G06F 3/0641 711/162 |
| 2014/0195480 A1* | 7/2014 | Talagala | G06F 12/0804 707/610 |
| 2016/0072886 A1* | 3/2016 | Lin | H04L 67/42 709/213 |
| 2016/0077920 A1* | 3/2016 | Regni | G06F 11/1435 707/649 |
| 2016/0255139 A1* | 9/2016 | Rathod | H04L 51/046 709/203 |
| 2016/0314046 A1* | 10/2016 | Kumarasamy | G06F 11/1448 |
| 2016/0344834 A1* | 11/2016 | Das | G06F 11/3476 |
| 2017/0235848 A1* | 8/2017 | Van Dusen | G06F 16/904 705/12 |
| 2017/0242935 A1* | 8/2017 | Wragg | G05B 19/0423 |
| 2017/0315878 A1* | 11/2017 | Purohit | G06F 3/067 |
| 2018/0046551 A1* | 2/2018 | Bourbonnais | G06F 16/2358 |
| 2018/0150492 A1* | 5/2018 | Rawat | G06F 3/0641 |
| 2018/0239674 A1* | 8/2018 | Hutchison | G06F 11/1471 |

\* cited by examiner

EFFICIENT SNAPSHOT GENERATION OF DATA TABLES

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. As such, the performance of many computing tasks has become distributed across a number of different computer systems and/or a number of different computer environments.

For instance, cloud computer services that include databases and tables implemented across various computer systems are becoming increasingly popular. Furthermore, cloud databases and tables often include hundreds of thousands, or even millions of databases/tables, each of which may comprise terabytes or more of data. Accordingly, storage efficiency, especially in relation to backups can be crucial in the management of such systems. For instance, many cloud computer services offer subscribers the ability to store particular data within provided tables. Again, such tables may often include terabytes or more of data, which subscribers may be interested in redundantly storing. However, generating backups for such tables can come at a large cost to the cloud computer services in the form of large, and oftentimes inefficient, uses of resources.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to generating a snapshot of data from a table associated with a particular user. For example, embodiments may include accessing one or more tree data structures that are distributed across one or more computer systems. Each of the one or more tree structures may include data associated with one or more users. Embodiments may further include identifying at least one tree data structure of the one or more tree data structures that includes data associated with the particular user of the one or more users. Embodiments may further include filtering the at least one data structure. Filtering the at least one data structure may comprise identifying only data that is associated with the particular user. Embodiments may also include generating a snapshot of the data associated with the particular user. Generating the snapshot of the data associated with the particular user comprises generating a data structure that is configured to map to each data page of the at least one tree data structure that includes data associated with the particular user.

In this way, snapshots of user data tables can be efficiently generated. In particular, filtering a number of search trees to identify data (i.e., snapshot data) associated with a particular user table may initially be performed. However, instead of creating a copy of all of the data of the user's table that would take large amounts of time and computer resources (both in terms of storage and processing), a data structure may be generated that maps to the data pages of the search tree(s) that include the identified snapshot data of the user's table. Such a structure (and therefore a snapshot of the data) may be created almost instantaneously using little computer resources (both in terms of storage and processing). Furthermore, each time an update to the user's table occurs after an initially generated snapshot has been created, an additional snapshot may be created. Such a process may be made more efficient by assigning either a previous tag or a current tag to each snapshot. Previous tags may then be merged, such that there are generally only two snapshots at any one time, while still allowing a user to identify the newest updates to the table (and therefore, the snapshot) via the newest snapshot having a current tag.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
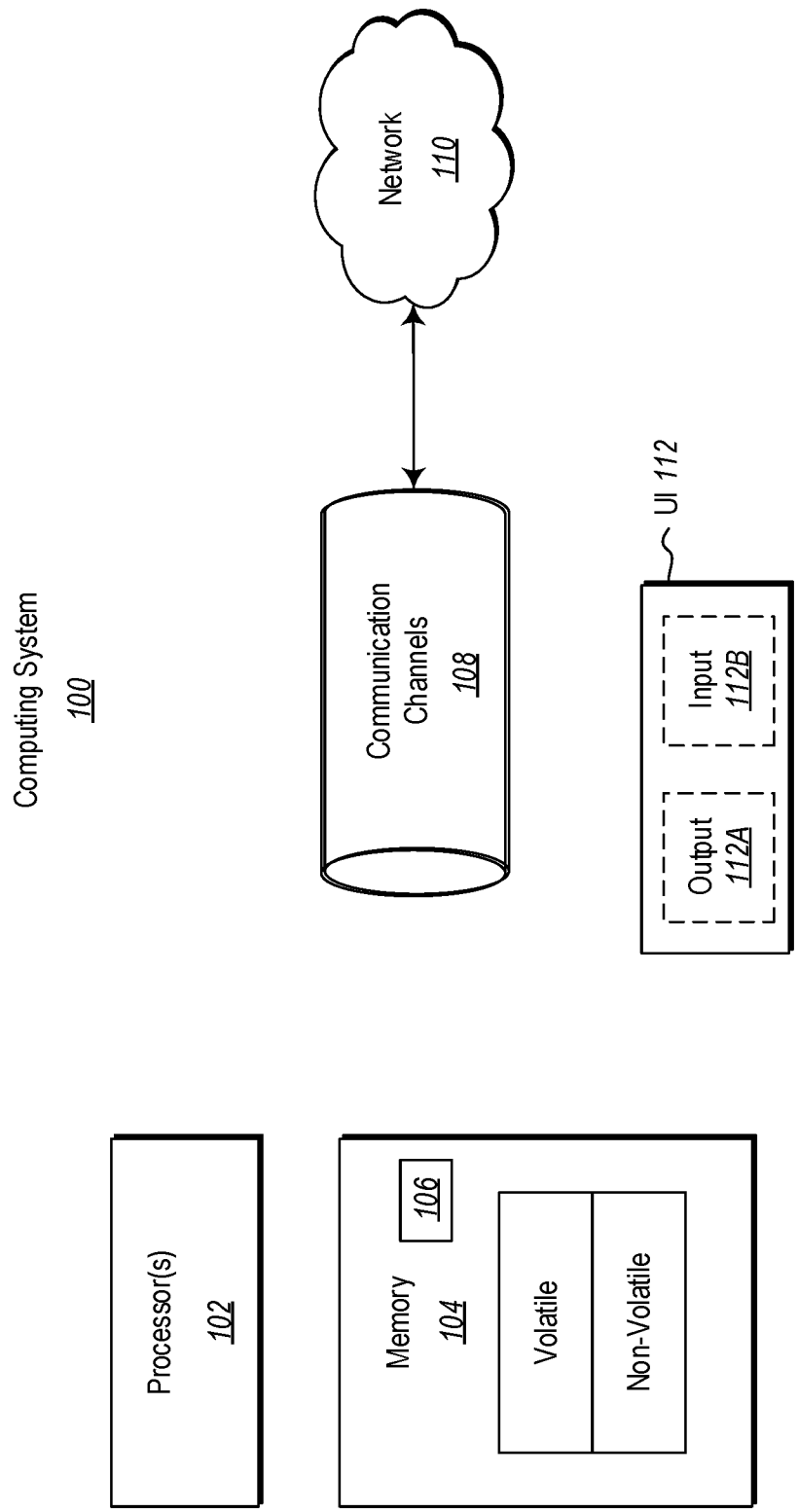
FIG. 1 illustrates an example computer architecture that facilitates operation of the principles described herein.

At least some embodiments described herein relate to generating a snapshot of data from a table associated with a particular user. For example, embodiments may include accessing one or more tree data structures that are distributed across one or more computer systems. Each of the one or more tree structures may include data associated with one or more users. Embodiments may further include identifying at least one tree data structure of the one or more tree data structures that includes data associated with the particular user of the one or more users. Embodiments may further include filtering the at least one data structure. Filtering the at least one data structure may comprise identifying only data that is associated with the particular user. Embodiments may also include generating a snapshot of the data associated with the particular user. Generating the snapshot of the data associated with the particular user comprises generating a data structure that is configured to map to each data page of the at least one tree data structure that includes data associated with the particular user.

In this way, snapshots of user data tables can be efficiently generated. In particular, filtering a number of search trees to identify data (i.e., snapshot data) associated with a particular user table may initially be performed. However, instead of creating a copy of all of the data of the user's table that would take large amounts of time and computer resources (both in terms of storage and processing), a data structure may be generated that maps to the data pages of the search tree(s) that include the identified snapshot data of the user's table. Such a structure (and therefore a snapshot of the data) may be created almost instantaneously using little computer resources (both in terms of storage and processing). Furthermore, each time an update to the user's table occurs after an initially generated snapshot has been created, an additional snapshot may be created. Such a process may be made more efficient by assigning either a previous tag or a current tag to each snapshot. Previous tags may then be merged, such that there are generally only two snapshots at any one time, while still allowing a user to identify the newest updates to the table (and therefore, the snapshot) via the newest snapshot having a current tag.

Some introductory discussion of a computing system will be described with respect to FIG. 1. Then generating a snapshot of data from a table associated with a particular user will be described with respect to FIGS. 2 through 5.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
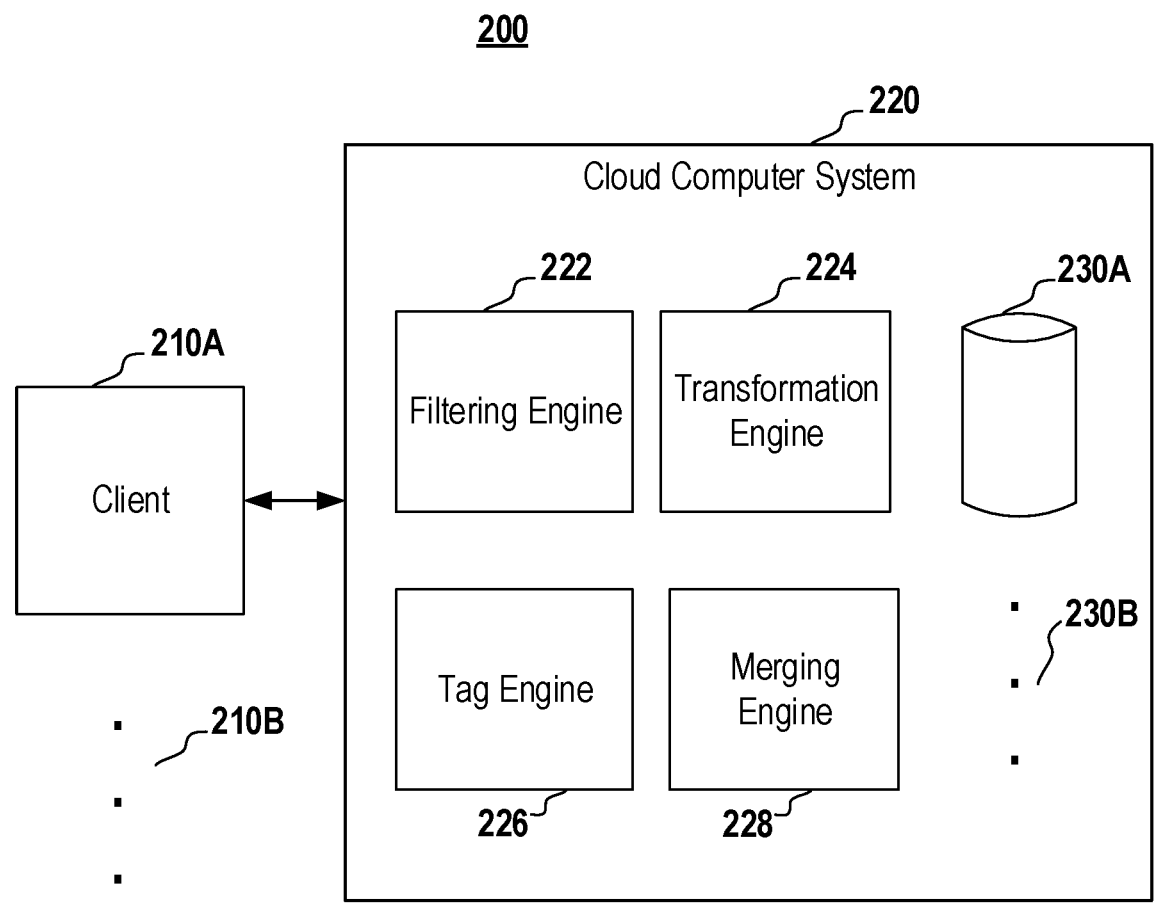
FIG. 2 illustrates an example environment for generating a snapshot of data from a table associated with a particular user.

FIG. 2 illustrates a computer environment 200 for generating a snapshot of a table associated with a user of a cloud computer system. As shown, FIG. 2 includes a client computer system 210 and a cloud computer system 220, which each may correspond to the computer system 100, as described with respect to FIG. 1. As such, the client computer system 210 may comprise any type of computer system (e.g., a desktop, laptop, smartphone, tablet, and so forth) running any type of operating system (e.g., MICROSOFT® WINDOWS®, GOOGLE® CHROME OS®, APPLE® MACOS®, and so forth). Furthermore, the client computer system 210 may comprise any computer system that is capable of communicating with cloud computer system 220. Notably, while only one client computer system 210A is shown in FIG. 2, ellipses 210B represents that any number of client computer systems may be used to practice the principles described herein.

As briefly described, the computer environment 200 includes the cloud computer system 220. The cloud computer system may comprise any type of cloud computer system that allows users to store and/or generate data within the cloud computer system. For instance, the cloud computer system 220 may comprise MICROSOFT AZURE®, AMAZON WEB SERVICES®, GOOGLE CLOUD PLATFORM™, and so forth. Accordingly, while only one cloud computer system 220 is shown, as one of skill in the art will understand, the cloud computer system may comprise any number of distributed computer systems that can singly, or in combination, be used to practice the principles described herein. As illustrated, the cloud computer system 220 includes various engines and/or functional blocks that may be used to perform various operations with respect to data of the cloud computer system, as further described herein. For instance, the cloud computer system 220 may include a filtering engine 222, a transformation engine 224, a tag engine 226, and a merging engine 228. The various engines and/or functional blocks of the cloud computer system 220 may be implemented on a local computer system of the cloud computer system 220 or may be implemented in a distributed fashion across a number of distributed computer systems of the cloud computer system 220.

The various engines and/or functional blocks of the cloud computer system 220 may be implemented as software, hardware, or a combination of software and hardware. Notably, the cloud computer system computer system 220 may include more or less than the engines/functional blocks illustrated in FIG. 2. Additionally, some of the engines/functional blocks may be combined as circumstances warrant. For instance, the tag engine 224 and the merging engine 226 may be combined into one functional block or more than two functional blocks. Although not illustrated, the various engine/functional blocks of the cloud computer system 220 may access and/or utilize a processor and memory, such as processor 102 and memory 104, as needed to perform their various functions.

The cloud computer system 220 may allow users to store particular data within one or more tables. Such tables may be stored as a search tree data structure. Search tree data structures may comprise a key-value store that includes a number of keys that each have a corresponding value. In an example, the keys may comprise names, while the corresponding values may comprise addresses. While names and addresses are used in the previous example, the types of data associated with keys and values of a search tree may be essentially limitless. In some embodiments, the search tree data structure may comprise a B+ tree, a log structured merge (LSM) tree, and so forth.

Figure 3:
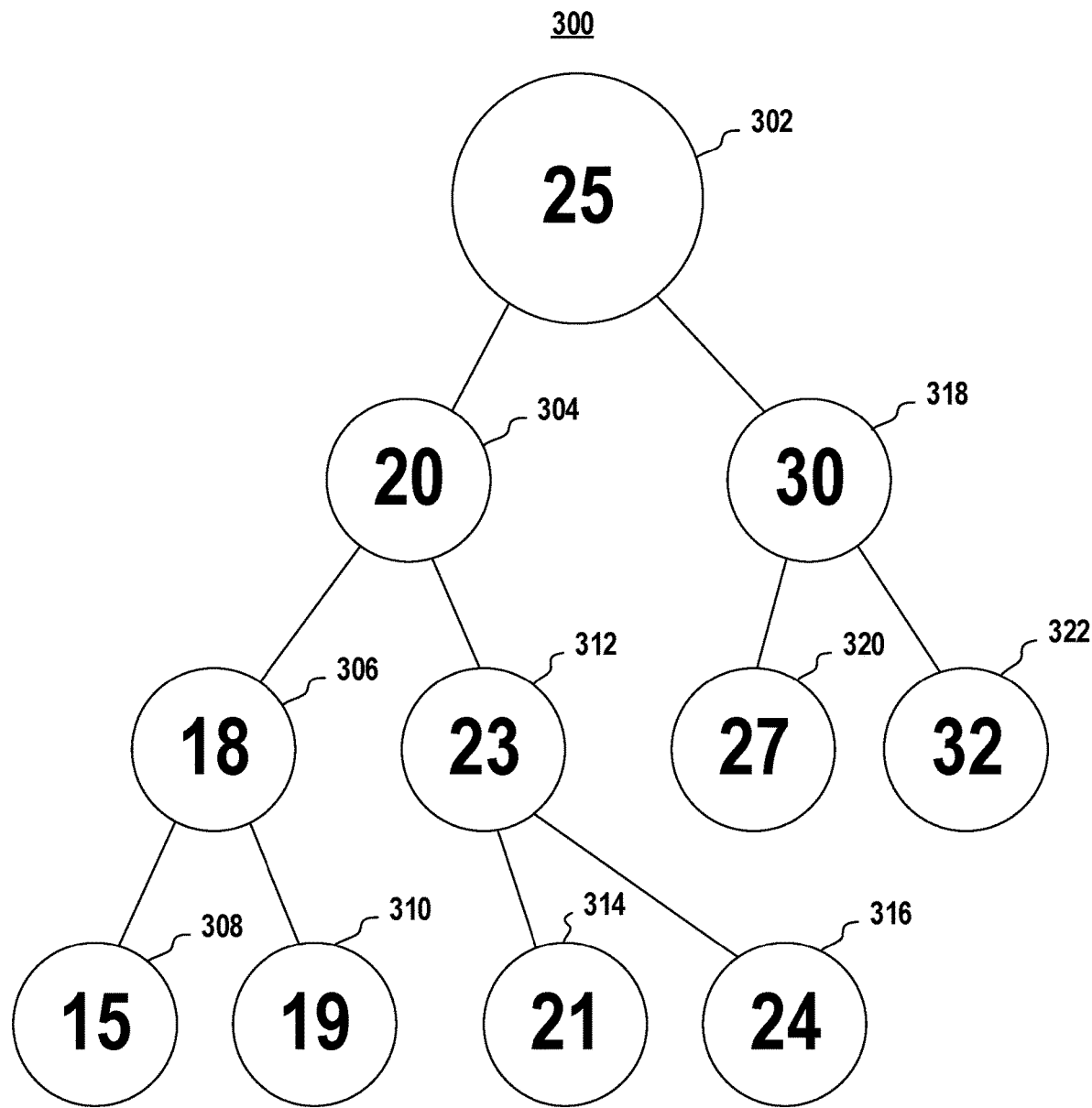
FIG. 3 illustrates an example of a search tree data structure.

FIG. 3 illustrates an exemplary search tree 300. As illustrated in FIG. 3, search trees may comprise trees wherein the key of any given node of the tree is greater than the keys of any sub-nodes to the left of the given node and is less than the keys of any sub-nodes to the right of the given node. For instance, as shown in FIG. 3, starting with node 302, each node to the left of the node 302 (i.e., node 304 through node 316) includes a key that is less than the key of the node 302, which is 25. On the other hand, each node to the right of the node 302 (i.e., node 318 through node 322) includes a key that is more than the key of the node 302. Notably, while the search tree illustrated in FIG. 3 is rather simple, including only 11 nodes, search trees being utilized to practice the principles described herein may comprise terabytes or more of data.

Such organization (i.e., lower values to the left of a given node and higher values to the right of the given node) of search tree data structures can allow for quick retrieval of requested keys from within the search tree (i.e., from a table of the user). Additionally, search trees may be very scalable, such that adding additional data to the search tree(s) can be performed quickly and efficiently. As briefly mentioned, tables may be made available by the cloud computer system 220 to users for storing any type of data. Those tables may then be stored as search trees by the cloud computer system. As such, users may want to create backups or snapshots of their tables. Notably, the term snapshot, as used herein, may comprise identifying a state of particular data at a point in time and recording (or creating a record of) the particular data in the identified state.

The search trees used to store user tables may be distributed across a number of different computer systems of the cloud computer system 220, as search trees can include terabytes or more of data. Additionally, data associated with multiple users may be stored throughout the search tree(s) (i.e., data associated with multiple different users may be intertwined within the search tree(s)). Such issues can make it difficult to create backups for each user, as there can be a lot of data to backup (e.g., perhaps terabytes of data or more), the data in the search tree(s) can be distributed across a number of different computer systems, the search tree(s) can include data associated with a number of different users, and so forth. Accordingly, when capturing a snapshot (i.e., a record of the data included within the search tree(s)) at a particular point in time for a particular user, such issues may be considered.

For instance, a number of search trees may include data associated with a table of the particular user, as described herein. As such, a filtering engine 222 of the cloud computer system 220 may first identify each search tree that includes data associated with the particular user. The filtering engine 222 may then filter out any search tree that does not include data associated with the particular user. The result of such filtering may include a number of search trees that include data associated with the particular user. The filtering engine may then filter out all data from the remaining search trees (i.e., the search trees that include data associated with the particular user) that is not associated with the particular user, such that only data associated with the user remains. The data that remains can then be used as a snapshot of the data associated with the user (i.e., the data at a point in time as stored in a table of the user). As such, the remaining data may be referred to herein as snapshot data (also referred to herein as remaining data and filtered data), as it is the data that, when recorded/stored, comprises a snapshot of the user's data Notably, generating the snapshot by storing the snapshot data as another tree (e.g., search tree) may be prohibitively expensive. More specifically, generating/storing another tree as a means of creating a snapshot, or backup, may use a large amount of storage, may use a large amount of computer resources, may take a relatively long time to generate, and so forth. Search trees are optimized for quick lookup/search, as well as quick insertion of data rather than for cheap cost, amount of storage used, and so forth. Accordingly, it may be advantageous to generate a snapshot by storing the snapshot data in a more efficient, cheaper format. More specifically, it may be advantageous to serialize the snapshot data (or filtered data) to allow the user to create copies of the snapshot, as described further herein.

Figure 4:
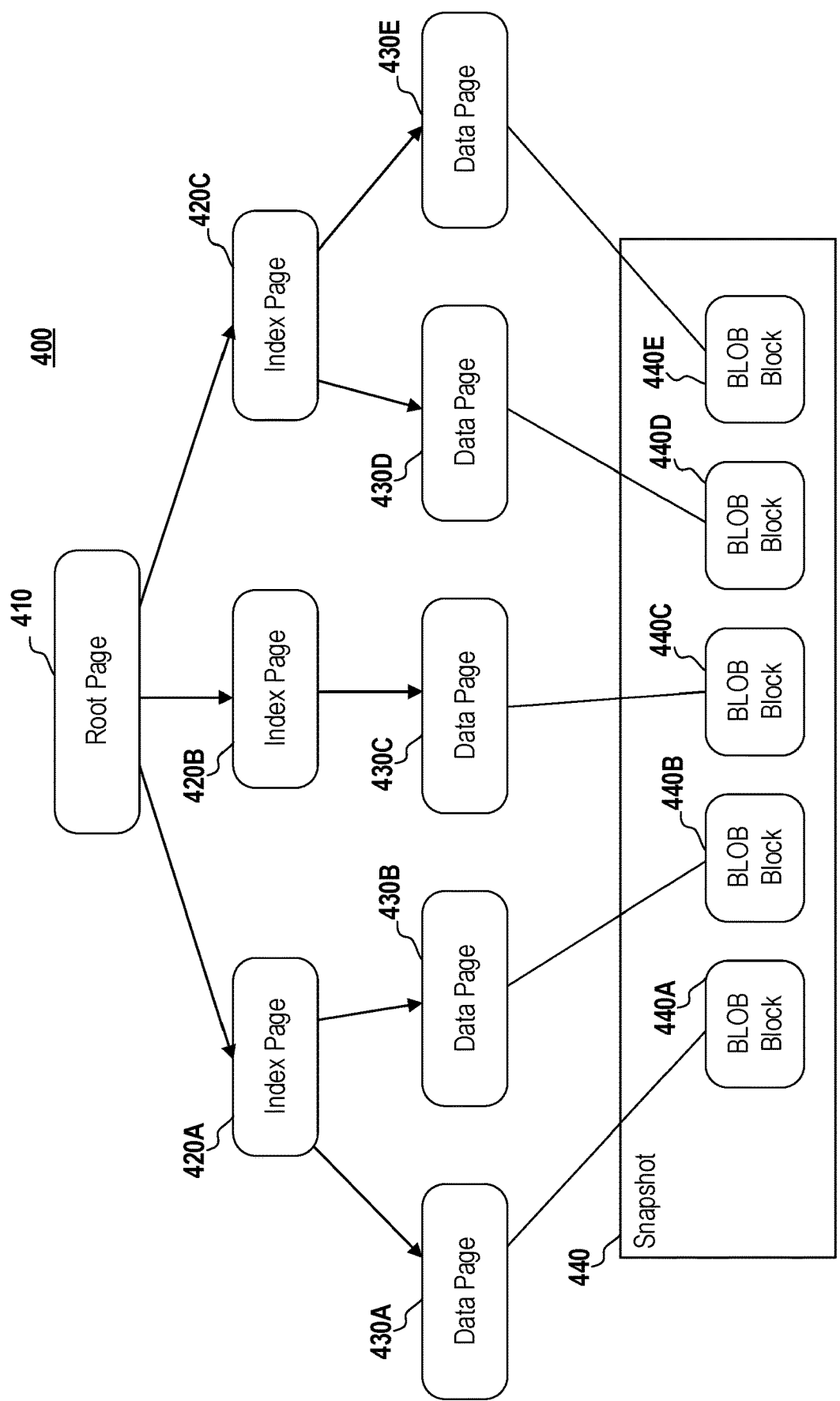
FIG. 4 illustrates another example of environment for generating a snapshot of data from a table associated with a particular user.

FIG. 4 illustrates an exemplary environment 400 for efficiently generating/storing a snapshot of user data that is originally stored in the form of a search tree. As illustrated, the environment 400 includes the data format of a search tree, including a root page 410, index pages 420 (i.e., index page 420A through index page 420C), and data pages 430 (i.e., data page 430A through data page 430B). The root page 410 and the index pages 430 include the keys of the search tree and any corresponding mappings. The data pages (also referred to as a leaf) include the actual data of the tree, or in other words, the data of the table associated with the user (i.e., the data that is being used to create a snapshot). Accordingly, the data included within the data pages comprises the snapshot data that is to be used to generate a snapshot.

For instance, as illustrated in FIG. 4, the data from the data pages may be stored in, or transformed into, Binary Large Object (BLOB) form (as represented by BLOB blocks 440-BLOB block 440A through BLOB block 440E) by the transformation engine 224. As shown in FIG. 4, each BLOB block 440 may be mapped to a corresponding data page that includes data from the table of the user. In other words, each BLOB block may include a pointer to a corresponding data page that includes data that, in combination, comprises the snapshot data (or can at least be used to recreate the search tree(s) associated with the table of the user, as further described herein). More specifically, each BLOB block may allow for addressing the data included within the data pages using offsets. While BLOB's are specifically discussed as being the data structure used to generate a snapshot of a table of a user, any data structure that allows for addressing data using offsets may be used.

As such, once the search tree data has been filtered to include only data associated with the particular user (for whom the snapshot is being generated), a snapshot of the snapshot data (or filtered data) may be generated by creating a data structure(s) (e.g., a BLOB data structure) that is capable of addressing the snapshot data (as included within the data pages) using offsets. Additionally, the data structure (s) (e.g., a BLOB) may include any other relevant schema data associated with the search tree(s) in which the snapshot data resides. The data pages to which the data structure(s) (e.g., BLOB data structure) is mapped can then be used to recreate the index pages 420 and the root page 410. Additionally, copies of the data structure (e.g., BLOB data structure) can be made, which copies will also be mapped to the data pages that form the snapshot data of a given user table.

In this way, a snapshot of a table (i.e., search tree) may be generated almost instantaneously even when the table includes terabytes or more of data, as the data of the table is not actually being copied. In contrast, while generating snapshots, as described herein, can be performed nearly instantaneously, generating a second table that comprises a copy of the first table could take multiple hours or more. Notably, pointers to the data (i.e., to data pages that include the data) can be used to generate a snapshot rather than storing another search tree as the snapshot because an append-only file system is used. An append-only file system may comprise a file system that does not allow previously written data to be modified. Instead, data is simply appended. In this way, the pointers included within each BLOB block (or other data structure capable of addressing data using offsets) may be used because the data pages (and data included therein) will not be modified.

A user may also continually update a table of the user, such that snapshots of the table need to be updated. In an example, assume that a first snapshot of a table has been generated. Now assume that the table has been updated, such that the first snapshot is no longer fully up-to-date. In such instances, a second snapshot may be generated that only includes the updated data that has been changed in the table (i.e., each snapshot is distinct). For instance, the tag engine 226 may assign a tag to each different snapshot of the table. In an example, the tag engine may assign a tag to each snapshot that is not the newest snapshot, indicating such. In a more specific example, the tag engine may assign to each snapshot that is not the newest snapshot a "previous" or "old" tag, indicating that there is a newer snapshot, while the tag engine may assign to the newest snapshot.

Accordingly, in some embodiments, the tag engine may assign only two types of tags, an old/previous tag and a "new" or "current" tag that indicates that the snapshot is the most recent snapshot. In such embodiments, each snapshot that has been assigned the same type of tag (e.g., old/ previous or new/current) may be merged together by the merge engine 228. Furthermore, in such embodiments, only one snapshot may be assigned a current or new tag at any given time.

In an example, assume that three snapshots have been taken, snapshot 1, snapshot 2, and snapshot 3. Assume, at a first point in time, that snapshot 1 was the first snapshot generated, and was initially assigned a current tag by the tag engine. Assume, at a second, later point in time, that snapshot 2 was the second snapshot generated, and was initially assigned a current tag by the tag engine. Accordingly, assume that in this example, only one snapshot may be assigned a current tag at any given point in time. As such, when snapshot 2 is generated and assigned the current tag, snapshot 1 will be assigned the previous tag. Now, assume, at a third, later point in time, that snapshot 3 was the third snapshot generated and is initially assigned the current tag. As such, snapshot 2 will then be assigned a previous tag along with snapshot 1. Accordingly, because snapshot 1 and snapshot 2 have both been assigned a previous tag, they may be merged, while snapshot 3 remains separate.

This process may then be continued with each new snapshot being assigned a current tag, as well as merging each snapshot that has been assigned a previous tag with any other snapshot that has also been assigned a previous tag. While snapshots that have been assigned previous tags do not have to be merged, merging such snapshots can save a large amount of storage space while also still allowing a user to relatively easily determine what are the newest changes/ updates of a table via the snapshot that is assigned the current tag at any given time.

Figure 5:
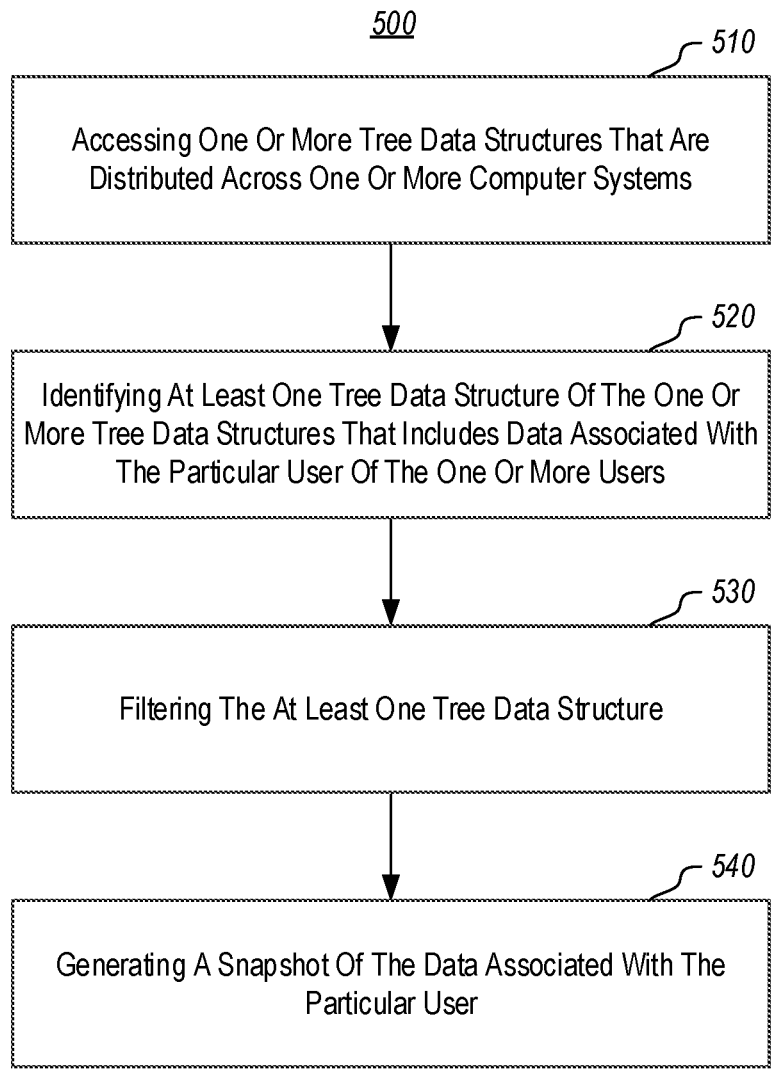
FIG. 5 illustrates a flowchart of a method for generating a snapshot of data from a table associated with a particular user.

FIG. 5 illustrates a flowchart of a method 500 for filtering data associated with generating a snapshot of data from a table associated with a particular user. Notably, the cloud computer system 220 may begin the process of generating a snapshot of user data for any number of reasons. For instance, the cloud computer system may generate a snapshot in response to a request from a user (e.g., receiving a request from a user via the client computer system 210), in response to a policy that includes generating snapshots for users periodically, and so forth. The method 500 is described with frequent reference to the environment 200 of FIG. 2, the search table 300 of FIG. 3, and the snapshot generation environment 400 of FIG. 4.

The method 500 may include accessing one or more tree data structures that are distributed across one or more computer systems (Act 510). For instance, the filtering engine 222 may access a table of a particular user that is stored in the form of a search table (e.g., the search table 300). The table of the particular user may be stored within more than one search table, each search table of which may be stored in a distributed manner across a number of computer systems. Additionally, each of the one or more tree structures may include data associated with more than one users.

The method 500 may further include identifying at least one tree data structure of the one or more tree data structures that includes data associated with a particular user of the one or more users (Act 520). For example, the filtering engine 222 may identify multiple search trees (from a plurality of existing search trees) that include data from the table of the user. The method 500 may also include filtering the at least one tree data structure (Act 530). For instance, the filtering engine 222 may filter the at least one tree data structure, such that only data associated with the particular user remains.

In some embodiments, filtering the at least one tree data structure may comprise identifying the locations of the data associated with the user (e.g., the addresses where the data associated with the user is stored). The method 500 may further include generating a snapshot of the data associated with the particular user (Act 540). For instance, the transformation engine 228 may use the filtered data (i.e., snapshot data) to generate a snapshot of the data associated with the user. In a more specific example, the transformation engine may generate a data structure that is configured to map to each data page of the at least one tree data structure that includes data associated with the particular user. For instance, the transformation engine may use a BLOB data structure to generate the snapshot (or mapping to the particular data pages of the one or more tree structures where the data associated with the user is located).

In this way, snapshots of user data tables can be efficiently generated. In particular, filtering a number of search trees to identify data (i.e., snapshot data) associated with a particular user table may initially be performed. However, instead of creating a copy of all of the data of the user's table that would take large amounts of time and computer resources (both in terms of storage and processing), a data structure may be generated that maps to the data pages of the search tree(s) that include the identified snapshot data of the user's table. Such a structure (and therefore a snapshot of the data) may be created almost instantaneously using little computer resources (both in terms of storage and processing). Furthermore, each time an update to the user's table occurs after an initially generated snapshot has been created, an additional snapshot may be created. Such a process may be made more efficient by assigning either a previous tag or a current tag to each snapshot. Previous tags may then be merged, such that there are generally only two snapshots at any one time, while still allowing a user to identify the newest updates to the table (and therefore, the snapshot) via the newest snapshot having a current tag.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
one or more processors; and
one or more computer-readable storage media having stored thereon computer-executable instructions that are executable by the one or more processors to cause the computer system to generate a snapshot of data from a table associated with a particular user, the snapshot operating as a stored backup for the data, the computer-executable instructions including instructions that are executable to cause the computer system to perform at least the following:
access one or more append-only file systems that include one or more tree data structures, each of the one or more tree structures including data associated with one or more users, wherein the one or more append-only file systems are file systems that do not allow previously written data to be modified such that the one or more tree data structures are also append-only;
identify at least one tree data structure of the one or more tree data structures that includes data associated with the particular user of the one or more users;
filter the at least one tree data structure, filtering the at least one data structure comprising identifying data associated with only the particular user;
generate a snapshot of the data associated with the particular user, wherein generating the snapshot comprises generating a data structure that is configured to map to each data page of the at least one tree data structure that includes the data associated with the particular user; and
store the snapshot as a stored backup for the data associated with the particular user, wherein storing the snapshot includes storing the data structure, which provides a mapping to each data page, while refraining from storing the data associated with the particular user in the stored backup, such that the stored backup includes mapping data but omits the particular user's actual data, and wherein the snapshot, which is based on the mapping to the data associated with the particular user as opposed to being based on an additional copy of the data associated with the particular user, is operable as the stored backup as a result of the one or more append-only file systems not allowing previously written data to be modified such that the mapping provides backup without reliance on the additional copy of the data.

2. The computer system in accordance with claim 1, wherein an additional snapshot is also generated each time an update to the table associated with the particular user occurs, each additional snapshot being generated at a later point in time than the generated snapshot.

3. The computer system in accordance with claim 2, wherein each of the one or more additional snapshots is assigned a tag of a particular type.

4. The computer system in accordance with claim 3, wherein each tag comprises one of two particular types.

5. The computer system in accordance with claim 4, wherein the two particular types of tags comprise a previous tag and a current tag.

6. The computer system in accordance with claim 5, wherein the previous tag is assigned to all snapshots that are older than a newest snapshot.

7. The computer system in accordance with claim 5, wherein the current tag is assigned to a newest snapshot.

8. The computer system in accordance with claim 5, wherein each snapshot that has been assigned a previous tag is merged together to create one snapshot.

9. The computer system in accordance with claim 1, wherein the tree data structure comprises a search tree data structure.

10. The computer system in accordance with claim 1, wherein the data structure comprises a Binary Large Object (BLOB).

11. A method, implemented at a computer system that includes one or more processors, for generating a snapshot of data from a table associated with a particular user, the snapshot operating as a stored backup for the data, said method comprising:
accessing one or more append-only file systems that include one or more tree data structures, each of the one or more tree structures including data associated with one or more users, wherein the one or more append-only file systems are file systems that do not allow previously written data to be modified such that the one or more tree data structures are also append-only;

identifying at least one tree data structure of the one or more tree data structures that includes data associated with the particular user of the one or more users;

filtering the at least one tree data structure, filtering the at least one data structure comprising identifying only data associated with the particular user;

generating a snapshot of the data associated with the particular user, wherein generating the snapshot comprises generating a data structure that is configured to map to each data page of the at least one tree data structure that includes the data associated with the particular user; and storing the snapshot as a stored backup for the data associated with the particular user, wherein storing the snapshot includes storing the data structure, which provides a mapping to each data page, while refraining from storing the data associated with the particular user in the stored backup, such that the stored backup includes mapping data but omits the particular user's actual data, and wherein the snapshot, which is based on the mapping to the data associated with the particular user as opposed to being based on an additional copy of the data associated with the particular user, is operable as the stored backup as a result of the one or more append-only file systems not allowing previously written data to be modified such that the mapping provides backup without reliance on the additional copy of the data.

12. The method in accordance with claim 11, further comprising generating an additional snapshot each time an update to the table associated with the particular user occurs, each additional snapshot being generated at a later point in time than the generated snapshot.

13. The method in accordance with claim 12, wherein each of the one or more additional snapshots is assigned a tag of a particular type.

14. The method in accordance with claim 13, wherein each tag comprises one of two particular types.

15. The method in accordance with claim 14, wherein the two particular types of tags comprise a previous tag and a current tag.

16. The method in accordance with claim 11, wherein mapping to each data page comprises addressing the data associated with the particular user using offsets.

17. The method in accordance with claim 11, wherein the tree data structure comprises a search tree data structure.

18. The method in accordance with claim 17, wherein the search tree data structure comprises either a B+ tree or a log structured merge (LSM) tree.

19. The method in accordance with claim 11, wherein the data structure comprises a Binary Large Object (BLOB).

20. One or more hardware storage devices having stored thereon computer-executable instructions that are executable by one or more processors of a computer system to cause the computer system to generate a snapshot of data from a table associated with a particular user, the snapshot operating as a stored backup for the data, the computer-executable instructions including instructions that are executable to cause the computer system to perform at least the following:

access one or more append-only file systems that include one or more tree data structures, each of the one or more tree structures including data associated with one or more users, wherein the one or more append-only file systems are file systems that do not allow previously written data to be modified such that the one or more tree data structures are also append-only;

identify at least one tree data structure of the one or more tree data structures that includes data associated with the particular user of the one or more users;

filter the at least one tree data structure, filtering the at least one data structure comprising identifying only data associated with the particular user;

generate a snapshot of the data associated with the particular user, wherein generating the snapshot comprises generating a data structure that is configured to map to each data page of the at least one tree data structure that includes the data associated with the particular user; and store the snapshot as a stored backup for the data associated with the particular user, wherein storing the snapshot includes storing the data structure, which provides a mapping to each data page, while refraining from storing the data associated with the particular user in the stored backup, such that the stored backup includes mapping data but omits the particular user's actual data, and wherein the snapshot, which is based on the mapping to the data associated with the particular user as opposed to being based on an additional copy of the data associated with the particular user, is operable as the stored backup as a result of the one or more append-only file systems not allowing previously written data to be modified such that the mapping provides backup without reliance on the additional copy of the data.

* * * * *